(12) United States Patent
Colpan et al.

(10) Patent No.: US 9,091,468 B2
(45) Date of Patent: Jul. 28, 2015

(54) FASTENER INCORPORATED WITH NUT PROVISION

(75) Inventors: Oguzhan Colpan, Waterford, MI (US); Jeffrey Victor Basinski, Grand Blanc, MI (US)

(73) Assignee: DENSO International America, Inc., Southfield, MI (US)

(*) Notice: Subject to any disclaimer, the term of this patent is extended or adjusted under 35 U.S.C. 154(b) by 33 days.

(21) Appl. No.: 13/167,025

(22) Filed: Jun. 23, 2011

(65) Prior Publication Data

US 2012/0328390 A1 Dec. 27, 2012

(51) Int. Cl.
*F16B 39/00* (2006.01)
*F16B 17/00* (2006.01)
*F25B 39/04* (2006.01)
*B60H 1/00* (2006.01)
*F16B 5/06* (2006.01)

(52) U.S. Cl.
CPC ............ *F25B 39/04* (2013.01); *B60H 1/00521* (2013.01); *F16B 5/0635* (2013.01); *F16B 5/0664* (2013.01); *Y10T 403/70* (2015.01)

(58) Field of Classification Search
CPC ..... F25B 39/04; Y10T 403/70; F16B 5/0635; F16B 5/0664; B60H 1/00521
USPC .................................................. 411/166, 104
See application file for complete search history.

(56) References Cited

U.S. PATENT DOCUMENTS

| | | | | |
|---|---|---|---|---|
| 3,670,796 A * | 6/1972 | Grimm | ......................... | 411/112 |
| 3,969,011 A * | 7/1976 | Yamada | ........................ | 439/569 |
| 4,676,706 A * | 6/1987 | Inaba | ............................ | 411/175 |
| 5,139,080 A * | 8/1992 | Bolton et al. | ................... | 165/67 |
| 5,219,016 A | 6/1993 | Bolton et al. | | |
| 5,538,377 A | 7/1996 | Stewart et al. | | |
| 5,778,599 A * | 7/1998 | Saito | .............................. | 49/375 |
| 5,795,117 A * | 8/1998 | Onoda | ........................... | 411/92 |
| 6,202,737 B1 * | 3/2001 | Mahe | ............................. | 165/67 |
| 6,273,182 B1 * | 8/2001 | Pautler et al. | ................... | 165/67 |
| 6,460,296 B1 * | 10/2002 | Arquevaux | ..................... | 49/375 |
| 6,510,891 B2 * | 1/2003 | Anderson et al. | ............... | 165/67 |
| 6,527,044 B2 * | 3/2003 | Mangold | ......................... | 165/67 |
| 6,772,982 B2 * | 8/2004 | Nakagawa et al. | ............ | 248/232 |
| 7,007,744 B2 * | 3/2006 | Kalbacher | ....................... | 165/67 |
| 7,121,369 B2 * | 10/2006 | Beck et al. | .................... | 180/68.4 |
| 7,246,978 B2 * | 7/2007 | Morishima et al. | ........... | 411/104 |
| 7,703,730 B2 * | 4/2010 | Best et al. | ................. | 248/220.22 |

* cited by examiner

*Primary Examiner* — Victor Batson
*Assistant Examiner* — Caroline L Natirboff
(74) *Attorney, Agent, or Firm* — Harness, Dickey & Pierce, P.L.C.

(57) ABSTRACT

An attachment system for two members includes a primary attachment device and a secondary attachment device for connecting the two members. When damage to the primary attachment device occurs, the secondary attachment device can be used to connect the two members without having to repair the primary attachment device.

16 Claims, 3 Drawing Sheets

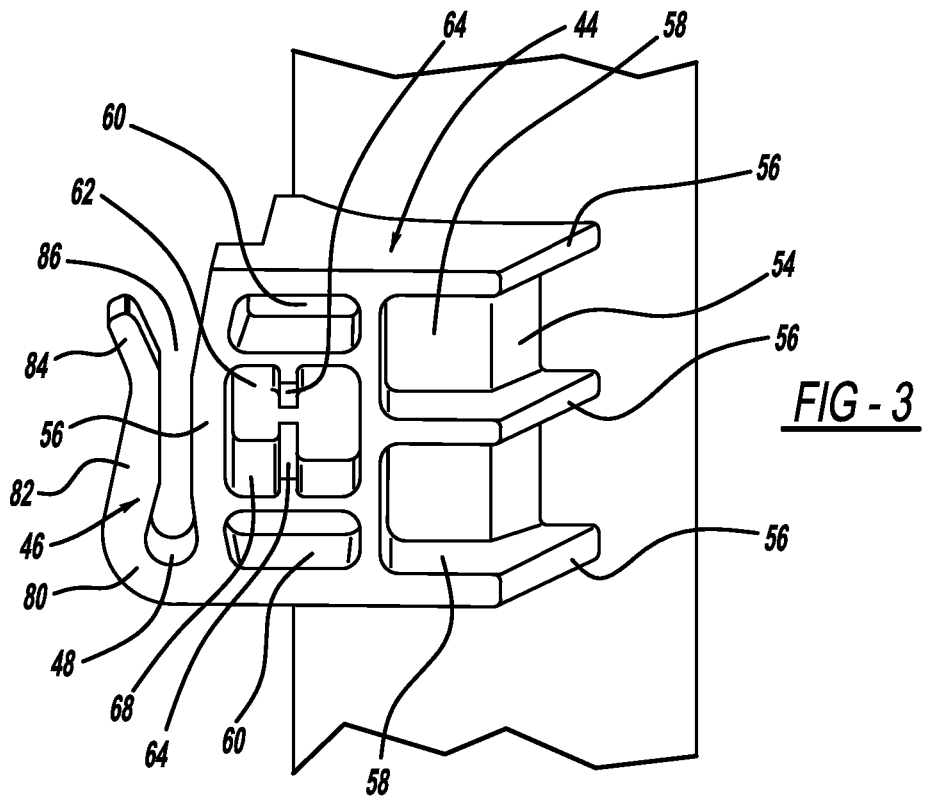
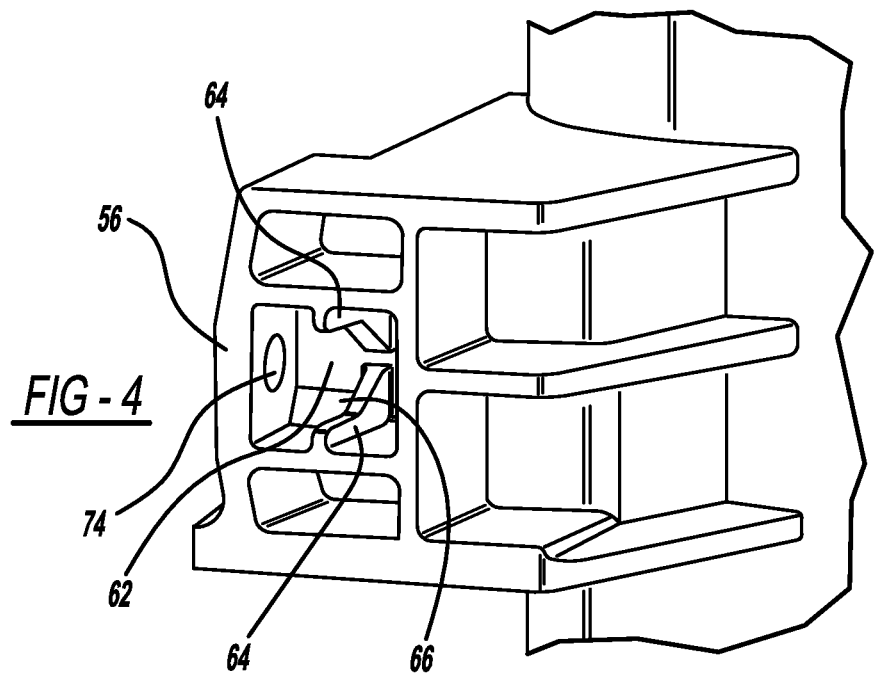

FASTENER INCORPORATED WITH NUT PROVISION

FIELD

The present disclosure relates to a fastener which connects two components together. More particularly, the present disclosure relates to a fastener which connects a condenser of an air-conditioning system or a fan shroud to a radiator and which incorporates a provision for incorporating a nut.

BACKGROUND

This section provides background information related to the present disclosure which is not necessarily prior art.

A car manufacturer sometimes requires that a radiator of a cooling system for a vehicle be adapted for easily mounting a condenser for an air-conditioning system or a fan shroud to the radiator. At other times, the car manufacturer will require that the radiator be supplied with the condenser and/or the fan shroud assembled to the radiator to simplify assembly of the vehicle.

Mounting of the condenser and/or the fan shroud is typically performed by inserting bolts through mounting holes formed in one of the components and threadingly engaging an insert or a nut located on or attached to the other component. In some mounting configurations one or more of the attachment points on one component is provided with a slot and the other component is provided with a tab or arm that is designed to engage the slot to assemble the two components together.

Typically, the attachment point is located on one or both of the tanks of the radiator and when the tank body is made from plastic, the attachment point is molded as part of the tank body. While this tab/slot attachment system provides a quick and simple attachment mechanism for the two components, if the slot becomes broken or damaged, there is no easy repair solution because the slot was formed during the molding process for the tank body.

SUMMARY

This section provides a general summary of the disclosure, and is not a comprehensive disclosure of its full scope or all of its features.

The present disclosure provides an attachment point which is molded as part of the tank body of the radiator. The slot is formed by a base and a money-clip styled arm. The base is provided with a nut holding feature which can be utilized if the money-clip styled arm is damaged or broken off of the base. In this manner, replacement of the entire radiator is not required when the attachment point is damaged.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a side view of the attachment mechanism illustrated in FIG. 2;

FIG. 4 is a side perspective view of the attachment mechanism illustrated in FIG. 2 with the arm broken off;

Corresponding reference numerals indicate corresponding parts throughout the several views of the drawings.

DETAILED DESCRIPTION

Example embodiments will now be described more fully with reference to the accompanying drawings.

Figure 1:
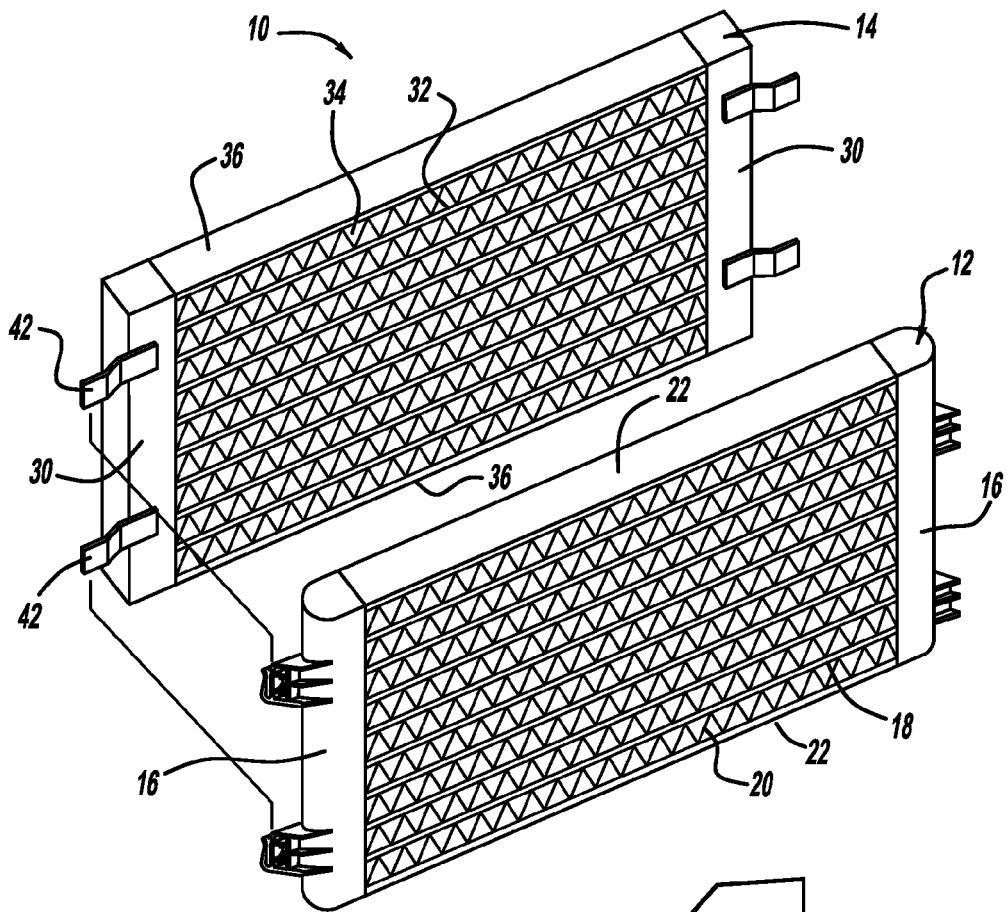
FIG. 1 is a perspective view of a radiator and a condenser attached to each other utilizing an attachment mechanism in accordance with the present disclosure.
Figure 2:
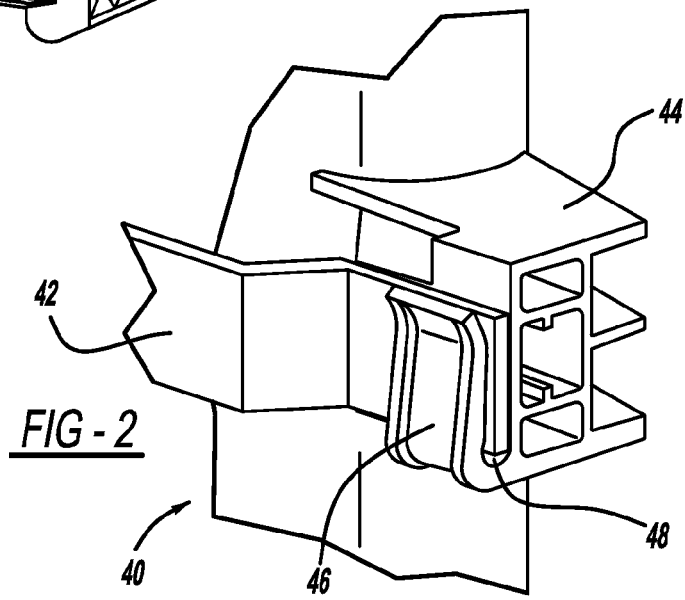
FIG. 2 is an enlarged perspective of one of the attachment mechanisms illustrated in FIG. 1.

FIG. 1 illustrates an assembly 10 of a first heat exchanger in the form of a radiator 12 and a second heat exchanger in the form of a condenser 14. Radiator 12 comprises a pair of tank bodies 16, a plurality of tubes 18, a plurality of fins 20 and a pair of support brackets 22. The plurality of tubes 18 extend between the pair of tank bodies 16 and each tube 18 defines one or more fluid passages which are in direct communication with a tank cavity defined by each tank body 16. Each of the plurality of fins 20 is disposed between adjacent tubes 18 to increase the heat transfer area of tubes 18. The pair of support brackets 22 are located at opposite sides of the stack of the plurality of tubes 18 and the plurality of fins 20 to provide support for the assembly. As is known in the art, radiator 12 exchanges heat between a first fluid (typically air) being blown past the plurality of tubes 18 and the plurality of fins 20 and a second fluid (typically engine coolant) flowing through the passages in the plurality of tubes 18 between the pair of tank bodies 16.

Condenser 14 comprises a pair of tank bodies 30, a plurality of tubes 32, a plurality of fins 34 and a pair of support brackets 36. The plurality of tubes 32 extend between the pair of tank bodies 30 and each tube 32 defines one or more fluid passages which are in direct communication with a tank cavity defined by each tank body 30. Each of the plurality of fins 34 is disposed between adjacent tubes 32 to increase the heat transfer area of tubes 32. The pair of support brackets 36 are located at opposite sides of the stack of the plurality of tubes 32 and the plurality of fins 34 to provide support for the assembly. As is known in the art, condenser 14 exchanges heat between a first fluid (typically air) being blown past the plurality of tubes 32 and the plurality of fins 34 and a second fluid (typically refrigerant) flowing through the passages in the plurality of tubes 32 between the pair of tank bodies 30.

Referring now to FIGS. 2-5, an attachment system which includes an attachment mechanism 40 and tab or leg 42 is shown in greater detail. Attachment mechanism 40 is a plastic component which is molded as an integral part of one or both of the pair of tank bodies 16 of radiator 12. Thus, attachment mechanism 40 and tank body 16 form a single piece component. Attachment mechanism 40 comprises a base 44 and a money-clip styled arm 46. As illustrated in the figures, base 44 and money-clip styled arm 46 define a slot 48. Disposed within the slot is tab or leg 42 which forms a part of condenser 14. During the assembly of condenser 14 with radiator 12, tab or leg 42 is aligned with slot 48 and inserted into slot 48. The assembly of tab or leg 42 into slot 48 elastically deflects money-clip styled arm 46 and tab or leg 42 is held within slot 48 due to the deflection of money-clip styled arm 46. The width of tab or leg 42 is larger than slot 48 before the assembly of condenser 14 to radiator 12 in order to avoid any gap or space between tab or leg 42 and base 44. While attachment mechanism 40 is illustrated as being part of radiator 12 and tab or leg 42 is illustrated as being part of condenser 14, condenser 14 could include attachment mechanism 40 and radiator 12 could include tab or leg 42.

Base 44 comprises a solid frame 54 and a plurality of ribs 56 attached to and extending from frame 54. The plurality of ribs 56 define a first plurality of pockets 58, a second plurality of pockets 60 and a nut pocket 62. The plurality of pockets 58 and 60 provide weight and material savings and the design of the plurality of ribs 56 and the plurality of pockets 58 and 60 are designed to provide a specified strength sufficient to mount condenser 14 to radiator 12 for the life of the vehicle.

Figure 5:
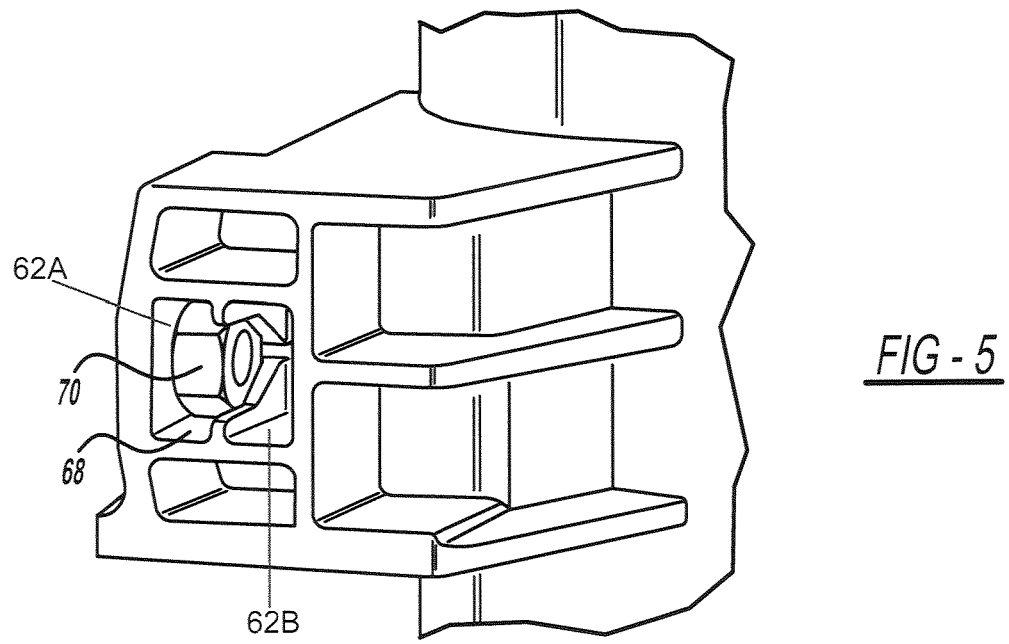
FIG. 5 is a side perspective view of the attachment mechanism illustrated in FIG. 4 after the assembly of a nut.

Nut pocket 62 comprises a pair of walls 64 and a pair of angled surfaces 66. The pair of walls 64 are parallel to and spaced from the rib 56 immediately adjacent money-clip styled arm 46 to divide nut pocket 62 into a first chamber 62A and a second chamber 62B. First chamber 62A defines a slot 68 between the pair of walls 64 and money-clip styled arm 46 which accepts a nut 70 as illustrated in FIG. 5. The width of slot 68 can be larger than the width of nut 70, it can be the same as nut 70 or it can be slightly smaller than nut 70 to provide the desired retention for nut 70. Each angled surface 66 is designed to directly engage a respective face of the hexagonal outer surface of nut 70 in order to prevent rotation during the tightening of a fastener 72 (FIG. 6) in relation to nut 70. While nut 70 is illustrated as having a hexagonal shaped outer surface, it is within the scope of the present disclosure to have any shape for the outer surface of nut 70 including, but not limited to, round or square. As illustrated in FIG. 4, rib 56, immediately adjacent money-clip styled arm 46, is provided with an optional through bore 74 through which fastener 72 extends to engage nut 70. Through bore 74 can be eliminated in the initial forming of rib 56 and can be drilled if and when it is necessary to utilize the secondary attachment method of attachment mechanism 40.

Money-clip styled arm 46 extends from base 44 to define slot 48. Money-clip styled arm 46 includes an arcuate portion 80 attached directly to base 44, a straight tapered portion 82 extending directly from arcuate portion 80 to form slot 48 and a straight angled portion 84 extending directly from straight tapered portion 82 to define a lead in opening 86 for tab or leg 42. The initial thickness of slot 48 is less than the thickness of tab or leg 42 such that tab or leg 42 elastically deflects money-clip styled arm 46 at arcuate portion 80 during the insertion of tab or leg 42 into slot 48.

Figure 6:
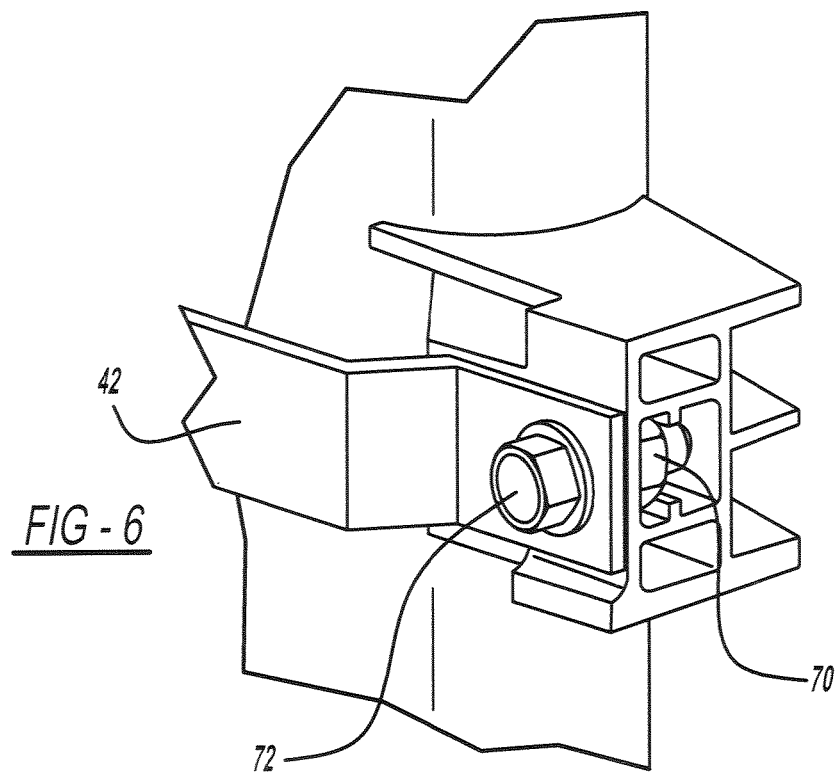
FIG. 6 is a side perspective view of the radiator and the condenser attached to each other utilizing the nut provision of the present disclosure.

As illustrated in FIGS. 4-6, when money-clip styled arm 46 is damaged or broken, nut 70 can be inserted into nut pocket 62 such that two faces of the hexagonal outer surface of nut 70 engage the pair of angled surfaces 66. A hole in tab or leg 42 can then be aligned with through bore 74 and fastener 72 can be inserted through the hole in tab or leg 42 and through through bore 74 to threadingly engage nut 70. Fastener 72 can then be tightened while nut 70 is prohibited from rotation by the engagement of nut 70 and angled surfaces 66. The hole in tab or leg 42 and/or through bore 74 can be initially provided in tab or leg 42 and attachment mechanism 40, respectively, or the hole in tab or leg 42 and/or through bore 74 can be created after money-clip styled arm 46 has been damaged or broken.

Attachment mechanism 40 provides a first or primary attachment device and a second or secondary attachment device for attaching condenser 14 to radiator 12. The first or primary attachment device is money-clip styled arm 46, slot 48 and base 44. The second or secondary attachment device is nut 70 provided in nut pocket 62 and fastener 72 extending through a tab or leg 42 and base 44 to engage nut 70.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An attachment comprising:
a first member;
a leg attached to the first member;
a second member;
an attachment mechanism attached to the second member, the
attachment mechanism defining a primary attachment device and a secondary attachment device separate from the primary attachment device; wherein
the primary attachment device comprises a rib having a substantially planar surface;
the leg attached to the first member engages one of the primary and secondary attachment devices to connect the first member to the second member;
the secondary attachment device includes a nut pocket having a substantially planar surface formed in a base of the primary attachment device, the nut pocket receiving a nut to form a portion of the secondary attachment device;
the primary attachment device connects the first member to the second member independent from the secondary attachment device;
the secondary attachment device connects the first member to the second member independent from the primary attachment device; and
the secondary attachment device is configured to be used instead of the primary attachment device.

2. The attachment according to claim 1, wherein the primary attachment device comprises an arm, the rib defined by the base and a first slot defined between the arm and rib of the base, the leg being disposed within the first slot to connect the first member to the second member.

3. The attachment according to claim 1, wherein the base defines a hole extending through the base and into the nut pocket.

4. The attachment according to claim 1, wherein the secondary attachment device includes the nut disposed within the nut pocket and a fastener extending through the leg and through the base to threadingly engage the nut.

5. The attachment according to claim 1, wherein the secondary attachment device includes means for retaining the nut within the nut pocket.

6. The attachment according to claim 1, wherein the secondary attachment device includes means for preventing rotation of the nut within the nut pocket.

7. The attachment according to claim 1, wherein the nut pocket includes an angled surface adapted to directly engage the nut to prevent rotation of the nut within the nut pocket.

8. The attachment according to claim 1, wherein the first member can be attached to the second member using only one of the primary and secondary attachment devices.

9. The attachment according to claim 2, wherein the nut pocket includes a pair of opposing walls spaced in a plane parallel to a plane defined by the rib of the base of the primary attachment device, the pair of opposing walls dividing the nut pocket into a first chamber and a second chamber, only the first chamber defining a second slot between the opposing pair of walls and the primary attachment device, the second slot receiving the nut to form the portion of the secondary attachment device, the first and second chambers being aligned in a direction perpendicular to the plane defined by the rib.

10. The attachment according to claim 9, wherein the pair of opposing walls and a solid wall of the secondary attachment device form the second chamber aligned with the second slot.

11. The attachment according to claim 10, wherein the secondary attachment device includes the nut disposed within the second slot and a fastener extending through the leg and through the base to threadingly engage the nut, the fastener extending between the pair of opposing walls and into the second chamber.

12. The attachment according to claim 9, wherein the secondary attachment device includes the nut disposed within the second slot and a fastener extending through the leg and through the base to threadingly engage the nut, the fastener extending between the pair of opposing walls into the second chamber.

13. The attachment according to claim 9, wherein the base defines a plurality of ribs, the plurality of ribs defining a plurality of pockets including the nut pocket.

14. The attachment according to claim 13, wherein the plurality of pockets include a pocket on opposite sides of the nut pocket.

15. The attachment according to claim 1, wherein the base defines a plurality of ribs, the plurality of ribs defining a plurality of pockets including the nut pocket.

16. The attachment according to claim 15, wherein the plurality of pockets include a pocket on opposite sides of the nut pocket.

* * * * *